(12) United States Patent
Cui et al.

(10) Patent No.: US 10,950,854 B2
(45) Date of Patent: Mar. 16, 2021

(54) ELECTRODE AND ELECTROCHEMICAL DEVICE

(71) Applicant: Ningde Amperex Technology Limited, Fujian (CN)

(72) Inventors: Wei Cui, Fujian (CN); Chaowang Lin, Fujian (CN); Changchuan Shi, Fujian (CN); Yisong Su, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 170 days.

(21) Appl. No.: 16/174,329

(22) Filed: Oct. 30, 2018

(65) Prior Publication Data
US 2020/0075943 A1 Mar. 5, 2020

(30) Foreign Application Priority Data

Aug. 28, 2018 (CN) .......................... 201810989867.2

(51) Int. Cl.
*H01M 10/0525* (2010.01)
*H01M 4/48* (2010.01)
*H01M 4/66* (2006.01)

(52) U.S. Cl.
CPC ............ *H01M 4/483* (2013.01); *H01M 4/48* (2013.01); *H01M 4/66* (2013.01); *H01M 4/661* (2013.01); *H01M 4/662* (2013.01); *H01M 4/665* (2013.01); *H01M 4/667* (2013.01); *H01M 10/0525* (2013.01); *H01M 4/666* (2013.01)

(58) Field of Classification Search
CPC ........ H01M 4/483; H01M 4/66; H01M 4/661; H01M 4/662; H01M 4/665; H01M 4/666; H01M 4/667; H01M 4/48; H01M 10/0525
USPC .......................................................... 429/231
See application file for complete search history.

(56) References Cited

U.S. PATENT DOCUMENTS

| | | | | |
|---|---|---|---|---|
| 9,819,053 | B1* | 11/2017 | Zimmerman | H01M 10/04 |
| 2006/0076243 | A1* | 4/2006 | Aoyama | C25D 5/44 |
| | | | | 205/153 |
| 2007/0026316 | A1* | 2/2007 | Imachi | H01M 10/0525 |
| | | | | 429/232 |
| 2010/0330410 | A1* | 12/2010 | Takahashi | H01M 10/052 |
| | | | | 429/129 |
| 2011/0111290 | A1* | 5/2011 | Uchida | H01M 4/663 |
| | | | | 429/207 |
| 2011/0195294 | A1* | 8/2011 | Lee | H01M 2/1686 |
| | | | | 429/144 |
| 2012/0141881 | A1* | 6/2012 | Geier | H01M 4/505 |
| | | | | 429/311 |

(Continued)

FOREIGN PATENT DOCUMENTS

| CN | 102314959 A | 1/2012 |
|---|---|---|
| CN | 102332556 B | 12/2014 |

*Primary Examiner* — Milton I Cano
*Assistant Examiner* — Suphia Quraishi
(74) *Attorney, Agent, or Firm* — Taylor English Duma LLP

(57) ABSTRACT

The present application provides an electrode and an electrochemical device comprising the electrode. The electrode comprises a current collector; and an inorganic layer arranged on a surface of the current collector, wherein the inorganic layer comprises a metal oxide and does not comprise a polymer. The electrode of the lithium ion battery provided by the present application has little influence on the volume energy density of the lithium ion battery while improving the safety performance of the lithium ion battery.

19 Claims, 1 Drawing Sheet

(56) References Cited

U.S. PATENT DOCUMENTS

| | | | | |
|---|---|---|---|---|
| 2012/0328915 A1* | 12/2012 | Hirose | ............ | H01M 4/366 |
| | | | | 429/61 |
| 2013/0089781 A1* | 4/2013 | Miyazaki | ............ | H01M 4/668 |
| | | | | 429/211 |
| 2013/0224558 A1* | 8/2013 | Kim | ............ | H01M 2/1686 |
| | | | | 429/145 |
| 2014/0162132 A1* | 6/2014 | Ishii | ............ | C23C 16/4417 |
| | | | | 429/231.95 |
| 2014/0242441 A1* | 8/2014 | Kwon | ............ | H01M 10/0436 |
| | | | | 429/144 |
| 2015/0364567 A1* | 12/2015 | Feng | ............ | H01L 29/66045 |
| | | | | 438/151 |
| 2016/0013480 A1* | 1/2016 | Sikha | ............ | H01M 4/661 |
| | | | | 427/126.6 |
| 2016/0240845 A1* | 8/2016 | Fujinoki | ............ | H01M 4/523 |
| 2017/0098857 A1* | 4/2017 | Carlson | ............ | H01M 10/4235 |
| 2018/0006315 A1* | 1/2018 | Pierpont | ............ | H01M 8/0245 |
| 2018/0040900 A1* | 2/2018 | Zhamu | ............ | H01M 10/0525 |
| 2019/0140249 A1* | 5/2019 | Fukui | ............ | H01M 10/0562 |

* cited by examiner

ELECTRODE AND ELECTROCHEMICAL DEVICE

CROSS-REFERENCE TO RELATED APPLICATION

This application claims priority to and benefits of Chinese Patent Application Serial No. 201810989867.2, filed with the China National Intellectual Property Administration on Aug. 28, 2018, and the entire content of which is incorporated herein by reference.

FIELD OF THE APPLICATION

The present application relates to the field of electrochemical devices, in particular, to an electrode and an electrochemical device.

BACKGROUND OF THE APPLICATION

Due to its own characteristics, electrochemical devices (such as lithium ion batteries) are prone to internal short-circuits and cause thermal runaway when subjected to abnormal conditions such as nail penetration, impact, and high temperature, resulting in fire or even explosion of lithium ion batteries.

In order to improve the safety performance of lithium ion batteries, currently, the surfaces of the positive electrode, the negative electrode or the separator of the lithium ion battery are mainly coated with an inorganic insulating coating composed of aluminum oxide, magnesium hydroxide, boehmite and a binder polymer to increase the surface resistance of the electrode for reducing the short circuit between the current collector and the active material layer. However, these techniques have largely reduced the rate performance or volume energy density of lithium ion batteries. Therefore, it is desirable to provide a solution that not only improves the safety performance of a lithium ion battery, but also does not significantly reduce the rate performance or volume energy density of a lithium ion battery.

SUMMARY OF THE APPLICATION

The present application provides an electrode having an inorganic layer formed on a surface of a current collector, and an electrochemical device comprising the electrode, wherein the inorganic layer comprises a metal oxide to improve the safety performance of the lithium ion battery under the conditions of nail penetration, impact, high temperature and the like.

The present application provides an electrode comprising a current collector; and an inorganic layer arranged on a surface of the current collector, wherein the inorganic layer comprises a metal oxide and does not comprise a polymer.

In the above electrode, the mass percentage of the metal element and the oxygen element of the inorganic layer in the inorganic layer is 98% to 100%.

In the above electrode, wherein the inorganic layer has a resistance of 0.1Ω or more.

In the above electrode, wherein the inorganic layer has a peeling force of 16 N/m or more.

In the above electrode, wherein the metal element comprises at least one selected from the group consisting of aluminum, titanium, magnesium, tin, cerium, zirconium, zinc, and calcium.

In the above electrode, wherein the metal oxide comprises at least one selected from the group consisting of alumina, titanium oxide, magnesium oxide, tin oxide, cerium oxide, zirconium oxide, zinc oxide, calcium oxide.

In the above electrode, wherein the chemical formula of the alumina is $Al_2O_{3-x}$, $0 \leq x \leq 2$.

In the above electrode, wherein the coverage of the inorganic layer on the current collector is 60% to 100%.

In the above electrode, wherein the inorganic layer has a thickness of 0.02 to 5 μm.

In the above electrode, wherein a gap is present in the inorganic layer.

In the above electrode, wherein the inorganic layer has a porosity of 1% to 20%.

In the above electrode, wherein the current collector comprises at least one selected from the group consisting of aluminum, copper, iron, gold, platinum, and nickel.

In the above electrode, wherein the electrode is a positive electrode or a negative electrode.

The present application also provides an electrochemical device comprising the above electrode.

In the above electrochemical device, wherein the electrochemical device comprises a lithium ion battery.

The electrode of the lithium ion battery provided by the present application may not significantly reduce volume energy density of the lithium ion battery while improving the safety performance of the lithium ion battery.

BRIEF DESCRIPTION OF THE ACCOMPANYING DRAWINGS

DETAILED DESCRIPTION OF THE PREFERRED EXAMPLES

Figure 1:
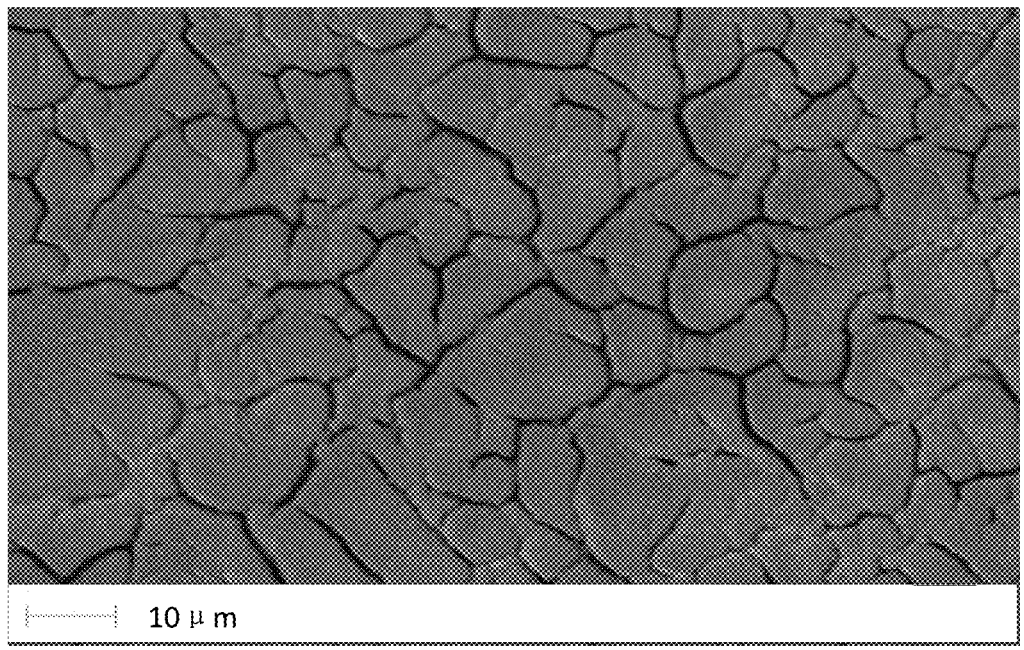
FIG. 1 shows a scanning electron microscope image of the surface of a positive electrode current collector on which an alumina inorganic layer is formed in example 3.

The exemplary embodiments are described in sufficient detail below, but these exemplary embodiments may be implemented in various ways and should not be construed as being limited to the embodiments set forth herein. Rather, these embodiments are provided so that the present application will be thorough and complete and the scope of the present application is fully conveyed to those skilled in the art.

At present, the main technologies for improving the safety performance for impact and nail penetration of lithium ion batteries are as follows: the surfaces of the positive electrode, the negative electrode or the separator of the lithium ion battery are coated with an inorganic insulating coating composed of aluminum oxide, magnesium hydroxide, boehmite and a binder polymer to increase the surface resistance of the electrode and to reduce the probability of short circuit between the current collector and the active material layer, so that the heat generation of the lithium ion battery in the short circuit may be reduced, and the safety protection function may be achieved. However, this technical solution results in a large loss in volume energy density due to the addition of a thick inorganic insulating coating. In addition, thick inorganic insulating coating may degrade the electrochemical performance (such as rate performance and cycle performance) of lithium ion batteries due to hindrance to the diffusion of lithium ions.

After an analysis for the ignition caused by an internal short circuit of a lithium ion battery, it was found that when the current collector contacts the active material layer, the resulted short-circuit power is large, and a large amount of heat is generated in a short time, especially in the case of this contact short-circuit between the positive electrode current collector and the negative active material layer. Therefore, increasing the short-circuit resistance of the current collector and the active material layer or avoiding the short-circuit contact between the two is the main direction for improving the safety performance of the lithium ion battery.

To this end, the present application provides an electrode comprising a current collector and an inorganic layer arranged on a surface of the current collector. The current collector comprises at least one selected from the group consisting of aluminum, copper, iron, gold, platinum, and nickel. The inorganic layer comprises a metal oxide, and does not comprise a polymer such as a binder. The metal oxide comprises at least one selected from the group consisting of alumina, titanium oxide, magnesium oxide, tin oxide, cerium oxide, zirconium oxide, zinc oxide, calcium oxide. By arranging the inorganic layer of the metal oxide on a surface of the positive electrode current collector, the short-circuit resistance when the positive electrode current collector is in contact with the negative active material layer is increased, thereby reducing the thermal runaway caused when the lithium ion battery is internally short-circuited. For example, by arranging the inorganic layer of the metal oxide on the surface of the positive electrode current collector, on the one hand, the surface roughness of the positive electrode current collector is increased, thereby increasing the adhesion of the positive electrode current collector to the positive active material; on the other hand, the resistance of the positive electrode current collector is increased, thereby improving the safety performance of the lithium ion battery.

The electrode of the present application may be a positive electrode or a negative electrode. The description of the present application is basically exemplified by a positive electrode, but it should be understood that the concept of the present application may be equally applied to a negative electrode, that is, such an inorganic layer is arranged on a surface of the negative electrode current collector.

The inorganic layer may be arranged on one or both sides of the current collector. The formation of an inorganic layer on both sides of the current collector facilitates better protection of the current collector.

In addition to the metal element and the oxygen element, the inorganic layer contains other impurities, and the mass percentage of the impurities is 0% to 2%, and the impurities are mainly N, S, P, Ca and the like. The mass percentage of the metal element and the oxygen element of the inorganic layer in the inorganic layer is 98% to 100%. The metal element comprises at least one selected from the group consisting of aluminum, titanium, magnesium, tin, cerium, zirconium, zinc, and calcium.

In some embodiments, the inorganic layer has a resistance of 0.1Ω or more, thereby contributing to the reduction of the short-circuit current between the current collector and the active material layer when the lithium ion battery is subjected to impact and nail penetration, so that the safety performance of the lithium ion battery is improved. The type, content and distribution of metal oxides may affect the resistance of the inorganic layer. For example, when the inorganic layer is composed of $Al_2O_3$ and Al, whether the distribution between the two is uniform or not has a great influence on the resistance of the inorganic layer.

In some embodiments, the inorganic layer has a peeling force of 16 N/m or more, which ensures that the inorganic layer has a good adhesion to the current collector. So when the lithium ion battery is subjected to an external force, the inorganic layer does not fall off from the current collector and loses its protective effect.

In some embodiments, the chemical formula of the alumina in the inorganic layer is $Al_2O_{3-x}$, $0 \leq x \leq 2$. When the content of the O element is high, the resistance of the current collector increases, thereby increasing the surface resistance of the current collector, thereby further increasing the impact pass rate of the lithium ion battery. And when the content of the O element is lowered, the metal aluminum in the inorganic layer is increased, the resistance of the inorganic layer is decreased, and the surface resistance of the current collector is decreased, so that the impact pass rate of the lithium ion battery is lowered.

In some embodiments, the inorganic layer has a certain coverage on the surface of the current collector, and the coverage is 60% to 100%. Increasing the coverage is beneficial to reduce the contact between the current collector and the active material layer, thereby reducing the direct contact of the lithium ion battery during abuse, so that the safety performance of the lithium ion battery is improved.

In some embodiments, the inorganic layer has a thickness of 0.02 μm to 5 μm, it has limited improvement for the surface resistance of the current collector when the thickness is too thin. The thicker the inorganic layer, the higher the safety performance of the lithium ion battery, but a large loss of volume energy density may be caused.

In some embodiments, a gap is present in the inorganic layer. The inorganic layer has a porosity of 1% to 20%. The presence of pores in the inorganic layer facilitates the infiltration of the electrolyte, but when the porosity is higher than 20%, the blocking effect of the inorganic layer is lowered.

In some embodiments, the formation of the inorganic layer is mainly prepared by a vapor deposition method. The vapor deposition method comprises chemical vapor deposition or physical vapor deposition, and an inorganic layer of different thickness, coverage, porosity, and composition may be obtained on the surface of the current collector by adjusting conditions of vapor deposition.

The present application also provides an electrochemical device comprising the above electrode. A lithium ion battery is described as an example of an electrochemical device in the present application, but the present application is not limited thereto. The electrode of the present application may also be applied to other suitable electrochemical devices. The lithium ion battery is taken as an example for specific description below.

The lithium ion battery comprises a positive electrode, a negative electrode, a separator, an electrolyte, and the like, wherein the electrode of the present application may be a positive electrode or a negative electrode.

Positive Electrode

The positive electrode includes a positive electrode material, and an inorganic layer may be arranged on a surface of the positive electrode current collector. The positive electrode material comprises a positive electrode material capable of intercalation and deintercalation of lithium (Li) (hereinafter, sometimes referred to as "positive electrode material capable of intercalation/deintercalation of lithium (Li)"). Examples of the positive electrode material capable of intercalation/deintercalation of lithium (Li) may include lithium cobaltate, lithium nickel cobalt manganate, lithium nickel cobalt aluminate, lithium manganate, lithium iron manganese phosphate, lithium vanadium phosphate, oxylithium vanadium phosphate, lithium iron phosphate, lithium titanate, and lithium-rich manganese-based materials.

Specifically, the chemical formula of lithium cobaltate may be expressed as Chemical Formula 1:

$$Li_xCo_aM1_bO_{2-c} \qquad \text{Chemical Formula 1}$$

where M1 represents at least one selected from the group consisting of nickel (Ni), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b, and c are respectively within the following ranges: $0.8 \le x \le 1.2$, $0.8 \le a \le 1$, $0 \le b \le 0.2$, $-0.1 \le c \le 0.2$.

The chemical formula of lithium nickel cobalt manganate or lithium nickel cobalt aluminate may be expressed as Chemical Formula 2:

$$Li_yNi_dM2_eO_{2-f} \qquad \text{Chemical Formula 2}$$

where M2 represents at least one selected from the group consisting of cobalt (Co), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), yttrium (Sr), tungsten (W), zirconium (Zr), and silicon (Si), and the values of y, d, e, and f are respectively within the following ranges: $0.8 \le y \le 1.2$, $0.3 \le d \le 0.98$, $0.02 \le e \le 0.7$, $-0.1 \le f \le 0.2$.

The chemical formula of lithium manganate can be expressed as Chemical formula 3:

$$Li_zMn_{2-g}M3_gO_{4-h} \qquad \text{Chemical Formula 3}$$

where M3 represents at least one selected from the group consisting of cobalt (Co), nickel (Ni), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), and tungsten (W), and the values of z, g and h are respectively within the following ranges: $0.8 \le z \le 1.2$, $0 \le g < 1.0$, and $-0.2 \le h \le 0.2$.

Negative Electrode

The negative electrode comprises a negative electrode material, and an inorganic layer may be arranged on a surface of the negative electrode current collector. The negative electrode material includes a negative electrode material capable of intercalation and deintercalation of lithium (Li) (hereinafter, sometimes referred to as "negative electrode material capable of intercalation/deintercalation of lithium (Li)"). Examples of the negative electrode material capable of intercalation/deintercalation of lithium (Li) may include a carbon material, a metal compound, an oxide, a sulfide, a nitride of lithium such as $LiN_3$, lithium metal, a metal forming an alloy with lithium, and a polymer material.

Among these negative electrode materials capable of intercalation/deintercalation of lithium (Li), examples of carbon materials may include low graphitized carbon, easily graphitized carbon, artificial graphite, natural graphite, mesocarbon microbeads, soft carbon, hard carbon, pyrolytic carbon, coke, glassy carbon, organic polymer compound sintered body, carbon fiber and active carbon. Coke may include pitch coke, needle coke, and petroleum coke. The organic polymer compound sintered body refers to materials obtained by calcining and carbonizing a polymer material such as a phenol plastic or a furan resin at a suitable temperature, and some of these materials are classified into low graphitized carbon or easily graphitized carbon. Examples of polymeric materials may include polyacetylene and polypyrrole.

Among these negative electrode materials capable of intercalation/deintercalation of lithium (Li), further, materials whose charge and discharge voltages are close to the charge and discharge voltages of lithium metal are selected. This is because of the fact that the lower the charge and discharge voltages of the negative electrode material are, the more easily the electrochemical device (for example, a lithium secondary battery) can have a higher energy density. The carbon material can be selected as the negative electrode material, since the crystal structure of the carbon material has only small changes during charging and discharging. Therefore, good cycle characteristics and high charge and discharge capacities can be obtained. In particular, graphite can be selected, since it can provide a high electrochemical equivalent and energy density.

In addition, the negative electrode material capable of intercalation/deintercalation of lithium (Li) may include elemental lithium metal, metal elements and semi-metal elements capable of forming an alloy together with lithium (Li), alloys and compounds including such elements, etc. In particular, they are used together with the carbon material, since good cycle characteristics and high energy density can be obtained in this case. In addition to alloys comprising two or more metal elements, alloys used herein further include alloys comprising one or more metal elements and one or more semi-metal elements. The alloys may be in the following forms of solid solutions, eutectic crystals (eutectic mixtures), intermetallic compounds, and mixtures thereof.

Examples of metal elements and semi-metal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the above-described alloys and compounds may include a material expressed as a chemical formula: $Ma_sMb_tLi_u$ and a material expressed as a chemical formula: $Ma_pMc_qMd_r$. In these chemical formulas, Ma represents at least one of metal elements and semi-metal elements capable of forming alloys with lithium, Mb represents at least one of these metal elements and semi-metal elements other than lithium and Ma, Mc represents at least one of the non-metal elements, Md represents at least one of these metal elements and semi-metal elements other than Ma, and s, t, u, p, q, and r satisfy $s>0$, $t \ge 0$, $u \ge 0$, $p>0$, $q>0$, and $r \ge 0$, respectively.

In addition, an inorganic compound that does not include lithium (Li) may be used in the negative electrode, such as $MnO_2$, $V_2O_5$, $V_6O_{13}$, NiS, and MoS.

Electrolyte

The lithium secondary battery described above further comprises an electrolyte, which may be one or more of a gel electrolyte, a solid electrolyte, and a liquid electrolyte. The liquid electrolyte comprises a lithium salt and a non-aqueous solvent.

The lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoborate. For example, $LiPF_6$ is used as a lithium salt, since it can provide high ionic conductivity and improve cycle performance.

The non-aqueous solvent may be a carbonate compound, a carboxylic acid ester compound, an ether compound, other organic solvents or combinations thereof.

The carbonate compound may be a chain carbonate compound, a cyclic carbonate compound, a fluorinated carbonate compound or combinations thereof.

Examples of chain carbonate compounds include diethyl carbonate (DEC), dimethyl carbonate (DMC), dipropyl carbonate (DPC), methylpropyl carbonate (MPC), ethyl propyl carbonate (EPC), methyl ethyl carbonate (MEC) and combinations thereof.

Examples of the cyclic carbonate compounds include ethylene carbonate (EC), propylene carbonate (PC), butylene carbonate (BC), vinyl ethylene carbonate (VEC), and combinations thereof.

Examples of the fluorocarbonate compound include fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethyl carbonate, 1-fluoro-1-methyl-ethylene carbonate, 1,2-difluoro-1-methylethylene carbonate, 1,1,2-trifluoro-2-methylethyl carbonate, trifluoromethyl ethylene carbonate, and combinations thereof.

Examples of carboxylic acid ester compounds include methyl acetate, ethyl acetate, n-propyl acetate, tert-butyl acetate, methyl propionate, ethyl propionate, γ-butyrolactone, decanolactone, valerolactone, mevalonolactone, caprolactone, methyl formate, and combinations thereof.

Examples of ether compounds include dibutyl ether, tetraethylene glycol dimethyl ether, diethylene glycol dimethyl ether, 1,2-dimethoxyethane, 1,2-diethoxyethane, ethoxy methoxy ethane, 2-methyltetrahydrofuran, tetrahydrofuran, and combinations thereof.

Examples of other organic solvents include dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate esters, and combinations thereof.

Separator

The separator comprises at least one selected from the group consisting of polyethylene, polypropylene, polyethylene terephthalate, polyimide, and aramid. For example, the polyethylene comprises at least one component selected from the group consisting of high density polyethylene, low density polyethylene, and ultra high molecular weight polyethylene. In particular, polyethylene and polypropylene, which have a good effect on preventing short circuits, and may improve the stability of the battery by the shutdown effect.

The separator surface may further comprise a porous layer arranged on at least one surface of the separator, the porous layer comprising inorganic particles and a binder. The inorganic particle is selected from a combination of one or more of alumina ($Al_2O_3$), silica ($SiO_2$), magnesia (MgO), titania ($TiO_2$), hafnium oxide ($HfO_2$), tin oxide ($SnO_2$), cerium oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide and barium sulfate. The binder is selected from the group consisting of polyvinylidene fluoride, a copolymer of vinylidene fluoride-hexafluoropropylene, polyamide, polyacrylonitrile, polyacrylate, polyacrylic acid, polyacrylate, sodium carboxymethylcellulose, polyvinylpyrrolidone, polyvinyl ether, polymethylmethacrylate, polytetrafluoroethylene and polyhexafluoropropylene.

The porous layer on the surface of the separator may improve the heat resistance, oxidation resistance and electrolyte wetting property of the separator, and enhance the adhesion between the separator and the electrode.

The positive electrode, the separator, the negative electrode are sequentially wound or folded or stacked into an electrode assembly, and then packaged (for example, in an aluminum plastic film) for encapsulation, and injected with an electrolyte for formation and packaging, thus a lithium ion battery is made.

Those skilled in the art will appreciate that the above described methods for preparing the lithium ion battery are merely examples. Other methods commonly used in the art may be employed without departing from the disclosure of the present application.

Some specific examples and comparative examples are listed below to better illustrate the application.

Comparative Example 1

(1) Preparation of the Negative Electrode

A solvent of deionized water and a thickener of sodium carboxymethyl cellulose (CMC) are added to a stirring mill to dissolve completely under vacuum to obtain an aqueous polymer solution; then, a conductive agent of conductive carbon black is added to the aqueous polymer solution, and stirred to be uniform; then a negative electrode material of artificial graphite is added and stirred slowly under vacuum to be uniform; then, a binder of styrene-butadiene rubber is added, and is slowly stirred under vacuum to be uniform to obtain a negative electrode slurry; subsequently, the negative electrode slurry is uniformly coated on both sides of a negative electrode current collector of copper foil, and after drying, a negative active material layer is obtained, and then compacted by a roll press, and finally slit and welded with an electrode tab, so as to obtain the negative electrode of the lithium ion battery. Among them, the mass ratio of the negative electrode material, the conductive agent, the binder, and the thickener is 94.5:1.5:2:2.

(2) Preparation of the Positive Electrode

A solvent of N-methylpyrrolidone (NMP) and a binder of polyvinylidene fluoride (PVDF) are added to a stirring mill to dissolve completely under vacuum to obtain a polyvinylidene fluoride solution; then, a conductive agent of conductive carbon black is added to the polyvinylidene fluoride solution, and stirred rapidly to be uniform; then a positive electrode material of lithium cobaltate ($LiCoO_2$) is added and stirred slowly under vacuum to be uniform to obtain a positive electrode slurry; subsequently, the positive electrode slurry is uniformly coated on both sides of an untreated positive electrode current collector of aluminum foil, dried and compacted by a roll press, and finally slit and welded with an electrode tab, so as to obtain the positive electrode of the lithium ion battery. Among them, the mass ratio of the positive electrode material, the binder and the conductive agent is 92:4:4.

(3) Preparation of Electrolyte

In a dried argon atmosphere glove box, ethylene carbonate (EC), propylene carbonate (PC), and diethyl carbonate (DEC) are mixed in a mass ratio of EC:PC:DEC=1:2:7, followed by adding lithium salt $LiPF_6$ and uniformly mixing to obtain an electrolyte. Among them, the concentration of $LiPF_6$ is 1.05 mol/L.

(4) Preparation of Separator

A polyethylene (PE) separator with a thickness of 16 μm is used.

(5) Preparation of Lithium Ion Battery

The positive electrode, the separator and the negative electrode are stacked in order so that the separator is in a role of isolation between the positive electrode and the negative electrode, and then are wound to obtain an electrode assembly; the electrode assembly is placed in a outer packaging foil of aluminum plastic film, and the prepared electrolyte is injected into the dried electrode assembly, and then subjected to processes such as vacuum encapsulation, stand, forming, capacity testing, shaping to obtain a soft package lithium ion battery.

Example 1

The preparation process of the lithium ion battery of Example 1 is identical to that of Comparative Example 1, except that an inorganic layer is formed on both sides of the positive electrode current collector. The inorganic layer is prepared by a vapor deposition method, and the vapor deposition method is as follows:

Taking an aluminum plate with a purity of 99.9% as a target, and the target is pretreated (deoiled, sandblasted, washed, baked) and installed in a vapor deposition chamber; the positive electrode current collector (aluminum foil) is placed in an appropriate position and then evacuate the device; after the vacuum of the device reaches the specification ($9.9 \times 10^{-2} \sim 9.9 \times 10^{-1}$ Pa), a voltage of 40V is applied between the target and the substrate, wherein the target (aluminum plate) is used as the positive electrode and the substrate is used as the negative electrode; a small amount of argon gas is introduced into the vacuum chamber to adjust the voltage between the target and the substrate for ionizing the argon gas, then after argon ionization, the target may be bombarded, and the target may be ionized to produce aluminum atoms; the voltage between the target and the substrate is adjusted to 40V, the magnetic field strength of the chamber to 0.5 Tesla, and the line speed of the current collector to 60 m/min, while introducing 100 mL/s of oxygen into the vacuum chamber; the aluminum atom are oxidized by the ionized oxygen atom to form the aluminum oxide; then the alumina may be deposited on the surface of the positive electrode current collector due to the presence of electric and magnetic fields.

By controlling the voltage between the target and the current collector, and the magnetic field strength in the chamber, the deposition rate of the inorganic layer may be controlled, thereby controlling the thickness and porosity of the inorganic layer and the adhesion of the inorganic layer to the current collector.

Example 2

The preparation process is consistent with that of Example 1, except that the line speed of the positive electrode current collector is 50 m/min.

Example 3

Figure 2:
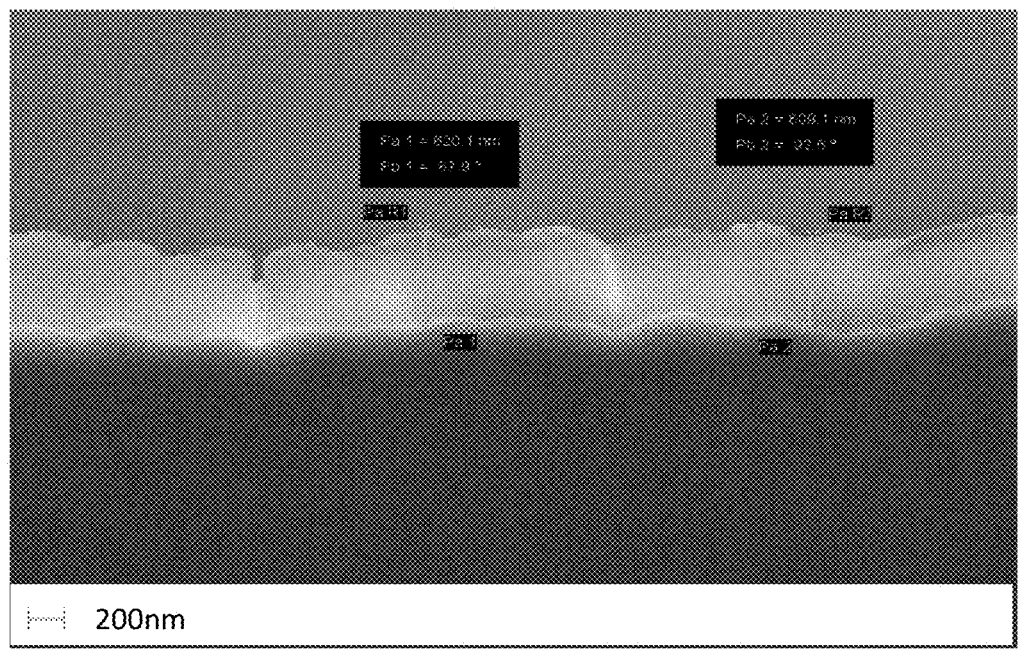
FIG. 2 shows a scanning electron microscope image of a cross section of a positive electrode current collector on which an alumina inorganic layer is formed in example 3.

The preparation process is consistent with that of Example 1, except that the line speed of the positive electrode current collector is 45 m/min. FIG. 1 shows a scanning electron microscope image of the surface of a positive electrode current collector on which an alumina inorganic layer is formed in Example 3. FIG. 2 shows a scanning electron microscope image of a cross section of a positive electrode current collector on which an alumina inorganic layer is formed in Example 3.

Example 4

The preparation process is consistent with that of Example 1, except that the line speed of the positive electrode current collector is 30 m/min.

Example 5

The preparation process is consistent with that of Example 1, except that the target used in Example 5 is a titanium plate and the line speed of the positive electrode current collector is 30 m/min.

Example 6

The preparation process is consistent with that of Example 1, except that a multi-target is used in Example 6, the targets are a titanium plate and an aluminum plate, and the line speed of the positive electrode current collector is 30 m/min.

Example 7

The preparation process is consistent with that of Example 1, except that the flow rate of oxygen is 50 mL/s.

Example 8

The preparation process is consistent with that of Example 1, except that the flow rate of oxygen is 80 mL/s and the line speed of the positive electrode current collector is 50 m/min.

Example 9

The preparation process is consistent with that of Example 1, except that the flow rate of oxygen is 150 mL/s and the line speed of the positive electrode current collector is 45 m/min.

Example 10

The preparation process is consistent with that of Example 1, except that the flow rate of oxygen is 180 mL/s and the line speed of the positive electrode current collector is 30 m/min.

Example 11

The preparation process is consistent with that of Example 1, except that the flow rate of oxygen is 200 mL/s and the line speed of the positive electrode current collector is 30 m/min.

Example 12

The preparation process is consistent with that of Example 1, except that the voltage between the target and the positive electrode current collector is 80V, the flow rate of oxygen is 250 mL/s and the line speed of the positive electrode current collector is 30 m/min.

Example 13

The preparation process is consistent with that of Example 1, except that the magnetic field strength of the chamber is 0.3 Tesla and the line speed of the positive electrode current collector is 45 m/min.

Example 14

The preparation process is consistent with that of Example 1, except that the magnetic field strength of the chamber is 0.45 Tesla and the line speed of the positive electrode current collector is 45 m/min.

Example 15

The preparation process is consistent with that of Example 1, except that the voltage between the target and the positive electrode current collector is 60V and the line speed of the positive electrode current collector is 45 m/min.

Example 16

The preparation process is consistent with that of Example 1, except that the voltage between the target and the positive electrode current collector is 60V, the magnetic field strength of the chamber is 0.8 Tesla and the line speed of the positive electrode current collector is 45 m/min.

Example 17

The preparation process is consistent with that of Example 1, except that the voltage between the target and the positive electrode current collector is 80V, the magnetic field strength of the chamber is 1 Tesla and the line speed of the positive electrode current collector is 45 m/min.

Example 18

The preparation process is consistent with that of Example 1, except that the inorganic layer is formed on one side of the positive electrode current collector and the line speed of the positive electrode current collector is 45 m/min.

Example 19

The preparation process is consistent with that of Example 1, except that the inorganic layer is formed on both sides of the positive electrode current collector and the negative electrode current collector of copper foils, and the line speed of the positive electrode current collector and the negative electrode current collector is 45 m/min.

Example 20

The preparation process is consistent with that of Example 1, except that the inorganic layer is not formed on the surface of the positive electrode current collector, but is formed only on one side of the negative electrode current collector of copper foil, and the line speed of the negative electrode current collector is 45 m/min.

Example 21

The preparation process is consistent with that of Example 1, except that the inorganic layer is not formed on the surface of the positive electrode current collector, but is formed only on both sides of the negative electrode current collector of copper foil, and the line speed of the negative electrode current collector is 45 m/min.

Example 22

The preparation process is consistent with that of Example 1, except that the magnetic field strength of the chamber is 0.3 Tesla.

Example 23

The preparation process is consistent with that of Example 1, except that the magnetic field strength of the chamber is 0.35 Tesla and the line speed of the positive electrode current collector is 50 m/min.

Example 24

The preparation process is consistent with that of Example 1, except that the magnetic field strength of the chamber is 0.7 Tesla and the line speed of the positive electrode current collector is 30 m/min.

Example 25

The preparation process is consistent with that of Example 1, except that the magnetic field strength of the chamber is 0.8 Tesla and the line speed of the positive electrode current collector is 30 m/min.

Example 26

The preparation process is consistent with that of Example 1, except that the line speed of the positive electrode current collector is 80 m/min.

Example 27

The preparation process is consistent with that of Example 1, except that the line speed of the positive electrode current collector is 50 m/min.

Example 28

The preparation process is consistent with that of Example 1, except that the line speed of the positive electrode current collector is 30 m/min.

Example 29

The preparation process is consistent with that of Example 1, except that the line speed of the positive electrode current collector is 20 m/min.

Example 30

The preparation process is consistent with that of Example 1, except that the line speed of the positive electrode current collector is 15 m/min.

Example 31

The preparation process is consistent with that of Example 1, except that the voltage between the target and the positive electrode current collector is 80V, the magnetic field strength of the chamber is 0.75 Tesla and the line speed of the positive electrode current collector is 20 m/min.

Example 32

The preparation process is consistent with that of Example 1, except that the voltage between the target and the positive electrode current collector is 35V and the line speed of the positive electrode current collector is 45 m/min.

Example 33

The preparation process is consistent with that of Example 1, except that the voltage between the target and the positive electrode current collector is 35V, the magnetic field strength of the chamber is 0.35 Tesla and the line speed of the positive electrode current collector is 30 m/min.

Example 34

The preparation process is consistent with that of Example 1, except that the voltage between the target and the positive electrode current collector is 20V, the magnetic field strength of the chamber is 0.35 Tesla and the line speed of the positive electrode current collector is 20 m/min.

Example 35

The preparation process is consistent with that of Example 1, except that the voltage between the target and the positive electrode current collector is 20V, the magnetic field strength of the chamber is 0.3 Tesla and the line speed of the positive electrode current collector is 15 m/min.

Thereafter, the following tests are performed on the lithium ion batteries of the examples and the comparative examples, and the specific test methods are as follows:

(1) Test for Side Impact of Lithium Ion Battery

The lithium ion battery is charged at a constant current of 0.5 C to a voltage of 4.4V at 25° C., and then charged at a constant voltage of 4.4V to a current of 0.05 C. The UL1642 test standard is used, wherein the side impact force is 13 kN, to perform a side impact test on the lithium ion battery. If the lithium ion battery does not explode, ignite, smoke, it is defined as "Pass", and 10 lithium-ion batteries are tested in each group. Then the pass rate of the side impact test for the lithium ion battery is calculated.

(2) Test for the Composition of Inorganic Layer

Qualitative analysis of the composition of the inorganic layer is performed by an energy dispersive spectroscopy (EDS); quantitative analysis of the composition of the inorganic layer may be obtained by an ICP (Inductively Coupled Plasma Spectrometer) test.

(3) Coverage of Inorganic Layer

The coverage of the inorganic layer is tested by a metallurgical Microscope (CCD) as follows: the treated current collector is taken to have a size of 5 mm*5 mm, and the number of parallel samples is 3, and the average of the test results of 3 parallel samples is taken.

(4) Test for Porosity

Taking a current collector without deposition of the inorganic layer for punching out 36 disks on a 1540.25 mm$^2$ die, the weight of the small disk separately is measured and then the thickness of 36 small disks is measured to calculate an average value, which is used as the weight and thickness of the substrate; taking a current collector with deposition of the inorganic layer for punching out 36 disks on a 1540.25 mm$^2$ die, the weight of the small disk separately is measured and then the thickness of each disk is separately measured to calculate the porosity of each disk: the weight of the disk is subtracted from the weight of the substrate to obtain the weight of the inorganic layer, the thickness of the substrate is subtracted from the thickness of the disk to obtain the thickness of the inorganic layer, and the pore volume of the inorganic layer=the actual volume (the thickness of the inorganic layer multiplied by the area of the inorganic layer (1540.25 mm$^2$)) minus the true volume of the inorganic layer (by querying the density of alumina and the density of aluminum, the density of the deposited layer is obtained according to a weighted average; the weight of the inorganic layer has been measured, and the weight of the inorganic layer is divided by the above density toobtain the true volume of the inorganic layer), porosity of the inorganic layer=1-true volume of the inorganic layer/actual volume=pore volume/actual volume.

(5) Thickness of Inorganic Layer

The thickness of the inorganic layer is measured by a micrometer, as follows: first, the thickness $d_1$ of the current collector is measured before treatment, and then measure the thickness $d_2$ of the treated current collector, and subtracting the thickness before the treatment from the thickness after treatment may obtain the thickness of the inorganic layer, that is, $d_{inorganic\ layer}=d_2-d_1$.

(6) Resistance of Inorganic Layer

Disassembling the fully charged lithium ion battery in the glove box, the electrode in which the inorganic layer is deposited on the current collector is punched into an electrode of 38.5 mm*23 mm, naturally air-dried, immersed in high-purity dimethyl carbonate, soaked for 2 hours, and then taken out for naturally air-drying for 6 hours; the current collector is neatly placed on a dust-free paper, pressed with a glass plate, and dried under vacuum at 45° C. for 10 h; the current collector is placed on a resistor probe, and the gas pressure is adjusted to 0.4 MPa for testing the resistance of the current collector; each group of samples is tested for 36 parallel data and averaged according to the parallel sample data to obtain the resistance of the inorganic layer of the current collector.

(7) Adhesion Between Inorganic Layer and Current Collector

Disassembling the fully charged lithium ion battery in the glove box, the region of the current collector covered with the inorganic layer is naturally air-dried and immersed in high-purity dimethyl carbonate for soaking, and taken out for naturally air-drying for 6 hours after 2 hours; the current collector is neatly placed on a dust-free paper, pressed with a glass plate, and dried under vacuum at 45° C. for 10 h; the current collector covered with the inorganic layer is cut with a blade to obtain a sample having a width of 30 mm* and a length of 150 mm, a NITTO 5000NS double-sided tape with a width of 20 mm*150 mm is applied to a steel plate with a width of 30 mm*length of 300 mm, and then the current collector sample is applied to the double-sided tape with the test surface facing down; a paper tape having a width equal to the current collector and a length greater than 80 mm of the sample length is fixed with a wrinkle glue, and the paper tape is folded up and fixed with a fixture, then the adhesion is tested using a high-speed rail AI-3000 tensile machine, with a test angle is 180° to ensure that the double-sided tape is stretched parallel to the sample, the stretching speed is 50 mm/min, and the tensile displacement is 50 mm; when the curve is flat and the displacement is greater than 10 mm, the tensile force f is used to calculate the adhesion, that is, F=f*g(9.8N/kg)/0.02 (the effective test width of the electrode), the unit being N/m.

(8) Volume Energy Density

The lithium ion battery is placed in a 25° C. incubator and allowed to stand for 30 minutes to keep the lithium ion battery at a constant temperature. The lithium ion battery reaching constant temperature is charged at a constant current of 0.5 C to a voltage of 4.4 V, charged at a constant voltage of 4.4 V to a current of 0.05 C, and then discharged to a voltage of 3.0 V with 0.5 C. Subsequently, the discharge energy is recorded.

$$\text{Volume energy density} = \text{discharge energy} / (\text{length} * \text{width} * \text{thickness of lithium ion battery}). \quad (5)$$

(9) Internal Resistance of Lithium Ion Battery

A lithium-ion battery of 3.85V is discharged with 0.1 C (current is $I_1$) for 10 s to record a voltage V1, then is discharged with 1 C (current is $I_2$) for 0.2 s to record a voltage V2, then the internal resistance of lithium ion battery=$(V1-V2)/(I_2-I_1)$.

The test results are shown in Table 1 below.

TABLE 1

| | voltage between target and current collector | magnetic field strength of chamber (Tesla) | flow rate of oxygen (mL/s) | line speed of current collector (m/min) | position of inorganic layer | setting positi | composition of inorganic layer | resistance of inorganic layer (Ω) | adhesion between inorganic layer and positive electrode current collector (N/m) | coverage of inorganic layer | thickness of coating (μm) | porosity of inorganic layer | impact test pass rate | volume energy density (Wh/L) | internal resistance of lithium ion battery (milliohm) |
|---|---|---|---|---|---|---|---|---|---|---|---|---|---|---|---|
| Examples | | | | | | | | | | | | | | | |
| 1 | 40 V | 0.5 | 100 | 60 | surface of positive electrode current collector | both sides | Al₂O₂.₈₁ (98.2%) | 0.5 | 25 | 90% | 0.5 | 3% | 8/10 | 728 | 29.42 |
| 2 | 40 V | 0.5 | 100 | 50 | surface of positive electrode current collector | both sides | Al₂O₂.₈₁ (98.8%) | 0.5 | 25 | 90% | 0.5 | 3% | 8/10 | 728 | 29.45 |
| 3 | 40 V | 0.5 | 100 | 45 | surface of positive electrode current collector | both sides | Al₂O₂.₈₁ (99.5%) | 0.5 | 25 | 90% | 0.5 | 3% | 8/10 | 728 | 29.52 |
| 4 | 40 V | 0.5 | 100 | 30 | surface of positive electrode current collector | both sides | Al₂O₂.₈₁ (100%) | 0.5 | 25 | 90% | 0.5 | 3% | 9/10 | 728 | 29.56 |
| 5 | 40 V | 0.5 | 100 | 30 | surface of positive electrode current collector | both sides | TiO₁.₉₁ (99.6%) | 0.5 | 25 | 90% | 0.5 | 3% | 8/10 | 728 | 29.43 |
| 6 | 40 V | 0.5 | 100 | 30 | surface of positive electrode current collector | both sides | multi-target (with both titanium oxide and aluminum oxide) (99.7%) | 0.5 | 25 | 90% | 0.5 | 3% | 8/10 | 728 | 29.5 |
| 7 | 40 V | 0.5 | 50 | 60 | surface of positive electrode current collector | both sides | Al₂O₂.₈₁ (99.5%) | 0.1 | 25 | 90% | 0.5 | 3% | 5/10 | 728 | 29.32 |
| 8 | 40 V | 0.5 | 80 | 50 | surface of positive electrode current collector | both sides | Al₂O₂.₈₁ (99.5%) | 0.3 | 25 | 90% | 0.5 | 3% | 7/10 | 728 | 29.48 |
| 3 | 40 V | 0.5 | 100 | 45 | surface of both | | Al₂O₂.₈₁ | 0.5 | 25 | 90% | 0.5 | 3% | 8/10 | 728 | 29.52 |

TABLE 1-continued

| | voltage between target and current collector | magnetic field strength of chamber (Tesla) | flow rate of oxygen (mL/s) | line speed of current collector (m/min) | position of inorganic layer | setting position | composition of inorganic layer | resistance of inorganic layer (Ω) | adhesion between inorganic layer and positive electrode current collector (N/m) | coverage of inorganic layer | thickness of coating (μm) | porosity of inorganic layer | impact test pass rate | volume energy density (Wh/L) | internal resistance of lithium ion battery (milliohm) |
|---|---|---|---|---|---|---|---|---|---|---|---|---|---|---|---|
| 9 | 40 V | 0.5 | 150 | 45 | surface of positive electrode current collector | both sides | $Al_2O_{2.81}$ (99.5%) | 1 | 25 | 90% | 0.5 | 3% | 9/10 | 728 | 29.94 |
| 10 | 40 V | 0.5 | 180 | 30 | surface of positive electrode current collector | both sides | $Al_2O_{2.81}$ (99.5%) | 3 | 25 | 90% | 0.5 | 3% | 10/10 | 728 | 30.32 |
| 11 | 40 V | 0.5 | 200 | 30 | surface of positive electrode current collector | both sides | $Al_2O_{2.81}$ (99.5%) | 5 | 25 | 90% | 0.5 | 3% | 10/10 | 728 | 32.33 |
| 12 | 80 V | 0.5 | 250 | 30 | surface of positive electrode current collector | both sides | $Al_2O_{2.81}$ (99.5%) | 10 | 25 | 90% | 0.5 | 3% | 10/10 | 728 | 34.56 |
| 13 | 40 V | 0.3 | 100 | 45 | surface of positive electrode current collector | both sides | $Al_2O_{2.81}$ (99.5%) | 0.5 | 16 | 90% | 0.5 | 3% | 5/10 | 728 | 29.52 |
| 14 | 40 V | 0.45 | 100 | 45 | surface of positive electrode current collector | both sides | $Al_2O_{2.81}$ (99.5%) | 0.5 | 20 | 90% | 0.5 | 3% | 6/10 | 728 | 29.52 |
| 3 | 40 V | 0.5 | 100 | 45 | surface of positive electrode current collector | both sides | $Al_2O_{2.81}$ (99.5%) | 0.5 | 25 | 90% | 0.5 | 3% | 8/10 | 728 | 29.52 |
| 15 | 60 V | 0.5 | 100 | 45 | surface of positive electrode current collector | both sides | $Al_2O_{2.81}$ (99.5%) | 0.5 | 30 | 90% | 0.5 | 3% | 10/10 | 728 | 29.52 |
| 16 | 60 V | 0.8 | 100 | 45 | surface of positive electrode current collector | both sides | $Al_2O_{2.81}$ (99.5%) | 0.5 | 50 | 90% | 0.5 | 3% | 10/10 | 728 | 29.52 |

TABLE 1-continued

| | voltage between target and current collector | magnetic field strength of chamber (Tesla) | flow rate of oxygen (mL/s) | line speed of current collector (m/min) | position of inorganic layer | setting position | composition of inorganic layer | resistance of inorganic layer (Ω) | adhesion between inorganic layer and positive electrode current collector (N/m) | coverage of inorganic layer | thickness of coating (μm) | porosity of inorganic layer | impact test pass rate | volume energy density (Wh/L) | internal resistance of lithium ion battery (milliohm) |
|---|---|---|---|---|---|---|---|---|---|---|---|---|---|---|---|
| 17 | 80 V | 1 | 100 | 45 | surface of positive electrode current collector | both sides | Al$_2$O$_{2.81}$ (99.5%) | 0.5 | 80 | 90% | 0.5 | 3% | 10/10 | 728 | 29.52 |
| 18 | 40 V | 0.5 | 100 | 45 | surface of positive electrode current collector | one side | Al$_2$O$_{2.81}$ (99.5%) | 0.5 | 25 | 90% | 0.5 | 3% | 6/10 | 731 | 29.29 |
| 19 | 40 V | 0.5 | 100 | 45 | surface of positive and negative electrode current collectors | both side | Al$_2$O$_{2.81}$ (99.5%) | 0.5 | 25 | 90% | 0.5 | 3% | 9/10 | 725 | 29.55 |
| 20 | 40 V | 0.5 | 100 | 45 | surface of negative electrode current collector | one side | Al$_2$O$_{2.81}$ (99.5%) | 0.5 | 25 | 90% | 0.5 | 3% | 5/10 | 730 | 29.33 |
| 21 | 40 V | 0.5 | 100 | 45 | surface of negative electrode current collector | both side | Al$_2$O$_{2.81}$ (99.5%) | 0.5 | 25 | 90% | 0.5 | 3% | 6/10 | 728 | 29.46 |
| 3 | 40 V | 0.5 | 100 | 45 | surface of positive electrode current collector | both sides | Al$_2$O$_{2.81}$ (99.5%) | 0.5 | 25 | 90% | 0.5 | 3% | 8/10 | 728 | 29.52 |
| 22 | 40 V | 0.3 | 100 | 60 | surface of positive electrode current collector | both sides | Al$_2$O$_{2.81}$ (99.5%) | 0.5 | 25 | 60% | 0.5 | 3% | 5/10 | 728 | 29.46 |
| 23 | 40 V | 0.35 | 100 | 50 | surface of positive electrode current collector | both sides | Al$_2$O$_{2.81}$ (99.5%) | 0.5 | 25 | 75% | 0.5 | 3% | 7/10 | 728 | 29.49 |
| 3 | 40 V | 0.5 | 100 | 45 | surface of positive electrode current collector | both sides | Al$_2$O$_{2.81}$ | 0.5 | 25 | 90% | 0.5 | 3% | 8/10 | 728 | 29.52 |

TABLE 1-continued

| | voltage between target and current collector | magnetic field strength of chamber (Tesla) | flow rate of oxygen (mL/s) | line speed of current collector (m/min) | position of inorganic layer | setting position | composition of inorganic layer | resistance of inorganic layer (Ω) | adhesion between inorganic layer and positive electrode current collector (N/m) | coverage of inorganic layer | thickness of coating (μm) | porosity of inorganic layer | impact test pass rate | volume energy density (Wh/L) | internal resistance of lithium ion battery (milliohm) |
|---|---|---|---|---|---|---|---|---|---|---|---|---|---|---|---|
| 24 | 40 V | 0.7 | 100 | 30 | surface of positive electrode current collector | both sides | Al₂O₂.₈₁ (99.5%) | 0.5 | 25 | 95% | 0.5 | 3% | 10/10 | 728 | 29.55 |
| 25 | 40 V | 0.8 | 100 | 30 | surface of positive electrode current collector | both sides | Al₂O₂.₈₁ (99.5%) | 0.5 | 25 | 100% | 0.5 | 3% | 10/10 | 728 | 29.68 |
| 26 | 40 V | 0.5 | 100 | 80 | surface of positive electrode current collector | both sides | Al₂O₂.₈₁ (99.5%) | 0.5 | 25 | 90% | 0.02 | 3% | 5/10 | 733 | 29.26 |
| 27 | 40 V | 0.5 | 100 | 50 | surface of positive electrode current collector | both sides | Al₂O₂.₈₁ (99.5%) | 0.5 | 25 | 90% | 0.2 | 3% | 7/10 | 731 | 29.48 |
| 3 | 40 V | 0.5 | 100 | 45 | surface of positive electrode current collector | both sides | Al₂O₂.₈₁ (99.5%) | 0.5 | 25 | 90% | 0.5 | 3% | 8/10 | 728 | 29.52 |
| 28 | 40 V | 0.5 | 100 | 30 | surface of positive electrode current collector | both sides | Al₂O₂.₈₁ (99.5%) | 0.5 | 25 | 90% | 1.0 | 3% | 10/10 | 723 | 29.78 |
| 29 | 40 V | 0.5 | 100 | 20 | surface of positive electrode current collector | both sides | Al₂O₂.₈₁ (99.5%) | 0.5 | 25 | 90% | 2.0 | 3% | 10/10 | 712 | 30.23 |
| 30 | 40 V | 0.5 | 100 | 15 | surface of positive electrode current collector | both sides | Al₂O₂.₈₁ (99.5%) | 0.5 | 25 | 90% | 5.0 | 3% | 10/10 | 681 | 32.35 |
| 31 | 80 V | 0.75 | 100 | 20 | surface of positive electrode current collector | both sides | Al₂O₂.₈₁ (99.5%) | 0.5 | 25 | 90% | 0.5 | 1% | 10/10 | 728 | 29.68 |

TABLE 1-continued

| | voltage between target and current collector | magnetic field strength of chamber (Tesla) | flow rate of oxygen (mL/s) | line speed of current collector (m/min) | position of inorganic layer | setting position | composition of inorganic layer | resistance of inorganic layer (Ω) | adhesion between inorganic layer and positive electrode current collector (N/m) | coverage of inorganic layer | thickness of coating (μm) | porosity of inorganic layer | impact test pass rate | volume energy density (Wh/L) | internal resistance of lithium ion battery (milliohm) |
|---|---|---|---|---|---|---|---|---|---|---|---|---|---|---|---|
| 3 | 40 V | 0.5 | 100 | 45 | surface of positive electrode current collector | both sides | $Al_2O_{2.81}$ (99.5%) | 0.5 | 25 | 90% | 0.5 | 3% | 8/10 | 728 | 29.52 |
| 32 | 35 V | 0.5 | 100 | 45 | surface of positive electrode current collector | both sides | $Al_2O_{2.81}$ (99.5%) | 0.5 | 25 | 90% | 0.5 | 5% | 7/10 | 728 | 29.48 |
| 33 | 35 V | 0.35 | 100 | 30 | surface of positive electrode current collector | both sides | $Al_2O_{2.81}$ (99.5%) | 0.5 | 25 | 90% | 0.5 | 10% | 6/10 | 728 | 29.43 |
| 34 | 20 V | 0.35 | 100 | 20 | surface of positive electrode current collector | both sides | $Al_2O_{2.81}$ (99.5%) | 0.5 | 25 | 90% | 0.5 | 15% | 6/10 | 728 | 29.37 |
| 35 | 20 V | 0.3 | 100 | 15 | surface of positive electrode current collector | both sides | $Al_2O_{2.81}$ (99.5%) | 0.5 | 25 | 90% | 0.5 | 20% | 5/10 | 728 | 29.29 |
| Comparative Example 1 | / | / | / | / | / | / | / | / | / | / | / | / | 0/10 | 734 | 29.19 |

As shown in Table 1, by comparing Examples 1-6 with Comparative Example 1, it is known that by arranging the inorganic layer on both sides of the current collector, the side impact test pass rate of the lithium ion battery is significantly improved, and the volume energy density of the lithium ion battery and the internal resistance of the lithium ion battery may be not substantially affected.

By comparing Examples 7-12 with 3, it is known that as the resistance of the inorganic layer increases, the side impact pass rate of the lithium ion battery increases, but the internal resistance of the lithium ion battery may also increase, so that when the resistance of the inorganic layer increases to 10 ohms, the internal resistance of the lithium ion battery may approach 35 milliohms. In addition, if the resistance of the inorganic layer is less than 0.1 ohm, the impact performance may not meet the requirements.

By comparing Examples 13-17 with 3, it is known that as the adhesion between the inorganic layer and the current collector increases, the side impact pass rate of the lithium ion battery also increases, and if the adhesion is <16 N/m, the side impact pass rate of the lithium ion battery may not meet the requirements.

By comparing Examples 18-21 with 3, it is known that when the inorganic layer is deposited on the positive electrode current collector or the negative electrode current collector, the side impact pass rate of the lithium ion battery may increase, and the deposition on both the positive electrode current collector and the negative electrode current collector achieves the optimal effects.

By comparing Examples 22-25 with 3, it is known that as the coverage of the current collector by the inorganic layer is improved, the side impact pass rate of the lithium ion battery is increased, and the internal resistance of the lithium ion battery is slightly increased, at the same time, if the coverage is <60%, the side impact pass rate of the lithium ion battery may not meet the requirements.

By comparing Examples 26-30 with 3, it is known that as the thickness of the inorganic layer is increased, the side impact pass rate of the lithium ion battery is increased, but the volume energy density of the lithium ion battery decreases, and if the thickness of the inorganic coating is less than 0.02 μm, the side impact pass rate of the lithium ion battery may not meet the requirements; if the thickness of the inorganic coating is more than 5 μm, the volume energy density of the lithium ion battery may be significantly lowered.

By comparing Examples 31-35 with 3, it is known that as the porosity of the inorganic layer increases, the side impact pass rate of the lithium ion battery decreases, and if the porosity of the inorganic layer is higher than 20%, the side impact pass rate of the lithium ion battery may not meet the requirements.

Those skilled in the art will appreciate that the above-described examples are merely exemplary embodiments and are not to be construed as limiting the present application, and various changes, substitutions and changes may be made without departing from the spirit and scope of the present application.

What is claimed is:

1. An electrode, comprising:
   a current collector; and
   an inorganic layer arranged on a surface of the current collector, wherein the inorganic layer comprises a metal oxide and does not comprise a polymer, wherein the metal oxide comprises alumina, wherein a chemical formula of the alumina is $Al_2O_{3-x}$, $0.19 \leq x \leq 2$.

2. The electrode according to claim 1, wherein a mass percentage of a metal element and an oxygen element of the inorganic layer in the inorganic layer is 98% to 100%.

3. The electrode according to claim 1, wherein the inorganic layer has a resistance of 0.1Ω or more.

4. The electrode according to claim 1, wherein the inorganic layer has a peeling force of 16 N/m or more.

5. The electrode according to claim 2, wherein the metal element further comprises at least one selected from the group consisting of titanium, magnesium, tin, cerium, zirconium, zinc, and calcium.

6. The electrode according to claim 1, wherein the metal oxide further comprises at least one selected from the group consisting of titanium oxide, magnesium oxide, tin oxide, cerium oxide, zirconium oxide, zinc oxide, calcium oxide.

7. The electrode according to claim 1, wherein a coverage of the inorganic layer on the current collector is 60% to 100%.

8. The electrode according to claim 1, wherein the inorganic layer has a thickness of 0.02 to 54 μm.

9. The electrode according to claim 1, wherein the inorganic layer is provided with a plurality of pores.

10. The electrode according to claim 1, wherein the inorganic layer has a porosity of 1% to 20%.

11. The electrode according to claim 1, wherein the current collector comprises at least one selected from the group consisting of aluminum, copper, iron, gold, platinum, and nickel.

12. The electrode according to claim 1, wherein the electrode is a positive electrode or a negative electrode.

13. An electrochemical device, comprising an electrode, wherein the electrode comprises:
    a current collector; and
    an inorganic layer arranged on a surface of the current collector, wherein the inorganic layer comprises a metal oxide and does not comprise a polymer, wherein the metal oxide comprises alumina, wherein the chemical formula of the alumina is $Al_2O_{3-x}$, $0.19 \leq x \leq 2$.

14. The electrochemical device according to claim 13, wherein a mass percentage of a metal element and an oxygen element of the inorganic layer in the inorganic layer is 98% to 100%.

15. The electrochemical device according to claim 13, wherein the inorganic layer has a resistance of 0.1Ω or more.

16. The electrochemical device according to claim 13, wherein the inorganic layer has a peeling force of 16 N/m or more.

17. The electrochemical device according to claim 14, wherein the metal element further comprises at least one selected from the group consisting of titanium, magnesium, tin, cerium, zirconium, zinc, and calcium.

18. The electrochemical device according to claim 13, wherein the metal oxide further comprises at least one selected from the group consisting of titanium oxide, magnesium oxide, tin oxide, cerium oxide, zirconium oxide, zinc oxide, calcium oxide.

19. The electrochemical device according to claim 13, wherein the electrochemical device comprises a lithium ion battery.

* * * * *